United States Patent [19]
Huang et al.

[11] Patent Number: 5,293,259
[45] Date of Patent: Mar. 8, 1994

[54] INTEGRATED RAINBOW HOLOGRAM

[75] Inventors: Qiang Huang, Huntsville; John A. Gilbert, Gurley, both of Ala.

[73] Assignee: The University of Alabama in Hunstville, Huntsville, Ala.

[21] Appl. No.: 986,508

[22] Filed: Dec. 7, 1992

[51] Int. Cl.$^5$ .......................... G03H 1/22; G03H 1/30
[52] U.S. Cl. .......................................... 359/1; 359/25; 359/32
[58] Field of Search .................... 359/25, 32, 33, 34, 359/15, 30, 1

[56] References Cited

U.S. PATENT DOCUMENTS

| | | | |
|---|---|---|---|
| 4,429,947 | 2/1984 | Benton | 359/32 |
| 4,623,215 | 11/1986 | Bazargan | 359/32 |
| 4,807,971 | 2/1989 | Nurano | 359/32 |
| 4,830,445 | 5/1989 | Robinson | 359/32 |
| 4,896,929 | 1/1990 | Haas et al. | 359/32 |
| 4,978,183 | 12/1990 | Vick | 359/15 |
| 5,071,210 | 12/1991 | Arnold et al. | 359/15 |
| 5,089,903 | 2/1992 | Kuwayama et al. | 359/15 |
| 5,101,193 | 3/1992 | Smith et al. | 359/15 |
| 5,130,825 | 7/1992 | Kok-Schram De Jong | 359/15 |
| 5,151,800 | 9/1992 | Upatnieks | 359/30 |

Primary Examiner—Martin Lerner
Attorney, Agent, or Firm—Oblon, Spivak, McClelland, Maier & Neustadt

[57] ABSTRACT

A holographic display and method for displaying hologram are disclosed. The method and apparatus provides a compact display arrangement in which the light source for illuminating the display is integral with the display, or in other words, an external light source is not necessary. The hologram utilized in the display is formed as a rainbow hologram, with a converging reference beam utilized in forming the diffraction grating upon the holographic plate. The display includes a pair of spaced transparent glass sheets, with the light source disposed between the glass sheets. The holographic plate formed with the converging reference beam is then mounted upon one of the glass sheets, with the light source illuminating the holographic plate with diverging illumination light. A mirror is associated with each of the transparent glass sheets at a location adjacent to the light source, with the reflective surfaces of the mirrors facing each other. Thus, the light from the light source is reflected by the mirrors and the transparent sheets, and impinges upon the holographic plate to provide the diverging illumination light. The method and apparatus provides a compact integrated holographic display.

17 Claims, 4 Drawing Sheets

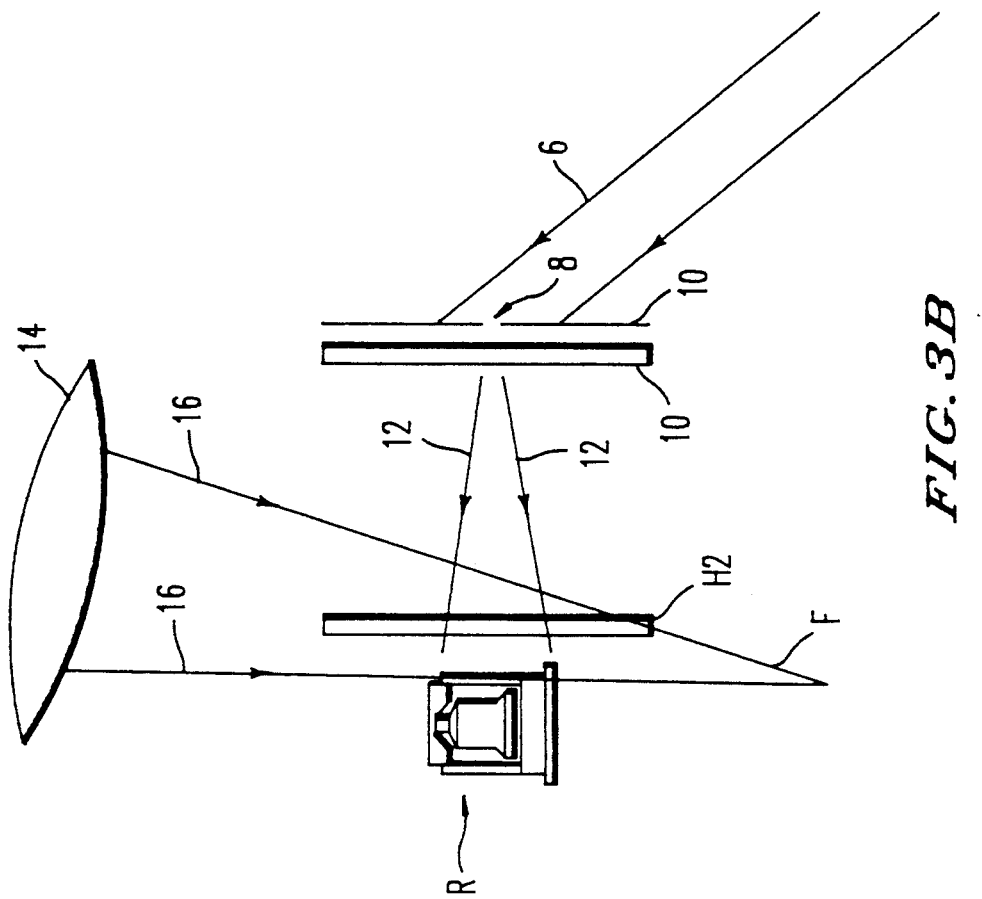
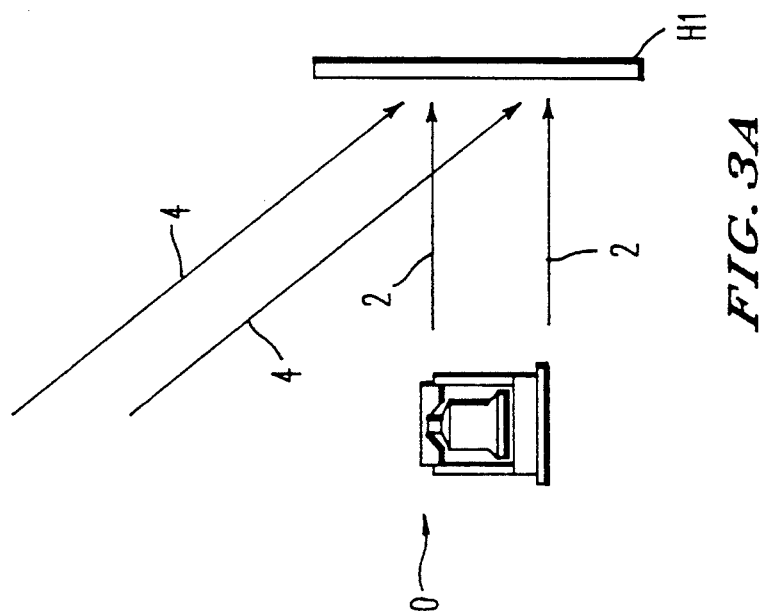
FIG. 3B
FIG. 3A

INTEGRATED RAINBOW HOLOGRAM

BACKGROUND OF THE INVENTION

1. Field of the Invention

The invention relates to a method and apparatus for forming and displaying rainbow holograms. In particular, the invention provides a hologram arrangement which can be displayed by a light source contained within the hologram display unit.

2. Discussion of the Background

Holograms are widely used for a variety of purposes including information displays and/or amusement devices. Holograms advantageously provide a three-dimensional display, with the image being displayed including the appearance of depth.

One type of hologram is referred to as a rainbow hologram. A rainbow hologram is typically a white light viewable hologram which is conventionally formed as shown in FIG. 1. As schematically shown in FIG. 1, a previously formed original hologram, often referred to as H1, is utilized for forming a holographic image on a second holographic plate, often referred to as H2. In forming the second hologram H2, the light source 20 illuminates the original or master hologram H1, often via mirrors 60, 62, 64 and a beam splitter 61, such that the light source also provides a reference beam directly upon the second holographic plate H2. As shown, H1 is typically disposed at approximately a 45° angle with respect to the direction of the illumination light, with H2 parallel to H1. However, in forming the rainbow hologram, only a slit of the original hologram H1 is allowed to illuminate the second holographic plate H2 for each illumination. Confinement of the illumination to a slit is achieved either by utilizing a slit beam produced, for example, by a cylindrical lens, or by masking the first holographic plate H1 with a mask M having a slit aperture, with the arrow A representing light emanating from the slit in the mask M. As a result, illumination of the second holographic plate H2 not only reconstructs the image formed by illuminating H1, but also reconstructs the slit in space.

As shown in FIG. 2, when this type of hologram is reconstructed using white light 56' to illuminate the second holographic plate H2, a plurality of reconstructed images are formed, for example as shown at 65, 66, 67 corresponding to red, green and blue reconstructed images. Each of the reconstructed images will have a slit S therein such that a viewer must view the recorded object from an angle/position in which all three of the slits are aligned. If viewed from a position in which the slits are not aligned, the image will either not be visible, or may only be partially visible. Typically, a holographic display requires an external light source to reconstruct or illuminate the image. Such arrangements usually consume excessive amounts of space, and require precise positioning of the light source with respect to the hologram being displayed. This can severely restrict the applications for which a holographic display can be utilized, and when utilized, the display is often inconvenient.

Accordingly, a holographic display system is desired which can allow for the display of a holographic image, while minimizing the space requirements for the display. The display with such a system should be able to conveniently and reliably display one or more holographic images. Preferably, such a display should also be capable of providing a high quality full or pseudo-color holographic image, without requiring a great deal of space and/or coordination in mounting an external light source to illuminate the display.

SUMMARY OF THE INVENTION

Accordingly, one object of the present invention is to provide an integrated hologram display in which the light source for illuminating the hologram is self-contained within the display unit.

Another object of the present invention is to provide a holographic display system in which a hologram is formed which can be displayed by a self-contained display unit.

It is another object of the present invention to provide a full color or pseudo-color holographic display arrangement which can be illuminated by a white light source.

It is a further object of the present invention to provide an improved holographic display device in which the hologram can be located on a front portion of the display, with the light source provided at a location behind the display, and further with the display designed such that excessive heat build-up is prevented.

It is another object of the present invention to provide a method for forming and displaying holograms, in which the hologram is formed such that it can be displayed in a compact, integrated display.

It is a further object of the present invention to provide a holographic display which can sequentially display plural images from a single holographic plate, or which can simultaneously or sequentially illuminate plural plates in a single display.

These and other objects and advantages are attained in accordance with the present invention in which a rainbow hologram is first formed utilizing a converging reference beam which is directed upon a second holographic plate (H2) while a slit of a first hologram (H1) is illuminated, such that a real image is formed on the second holographic plate with converging reference light. The rainbow hologram is then illuminated by a display device formed in accordance with the present invention, which utilizes a white light source for illuminating the rainbow hologram. The display includes a white light source disposed between a pair of glass sheets, with aluminum mirrors provided for reflecting the light source such that it impinges upon the rainbow hologram as a diverging illumination light source. The mirrors also serve to dissipate heat, thereby preventing excessive temperatures within the display.

BRIEF DESCRIPTION OF THE DRAWINGS

A more complete appreciation of the present invention and many of the attendant advantages thereof will become readily apparent from the following detailed description, particularly when considered in conjunction with the drawings in which:

FIGS. 3A and B illustrate the method and apparatus for forming a rainbow hologram in accordance with the present invention;

DESCRIPTION OF THE PREFERRED EMBODIMENTS

Figure 1:
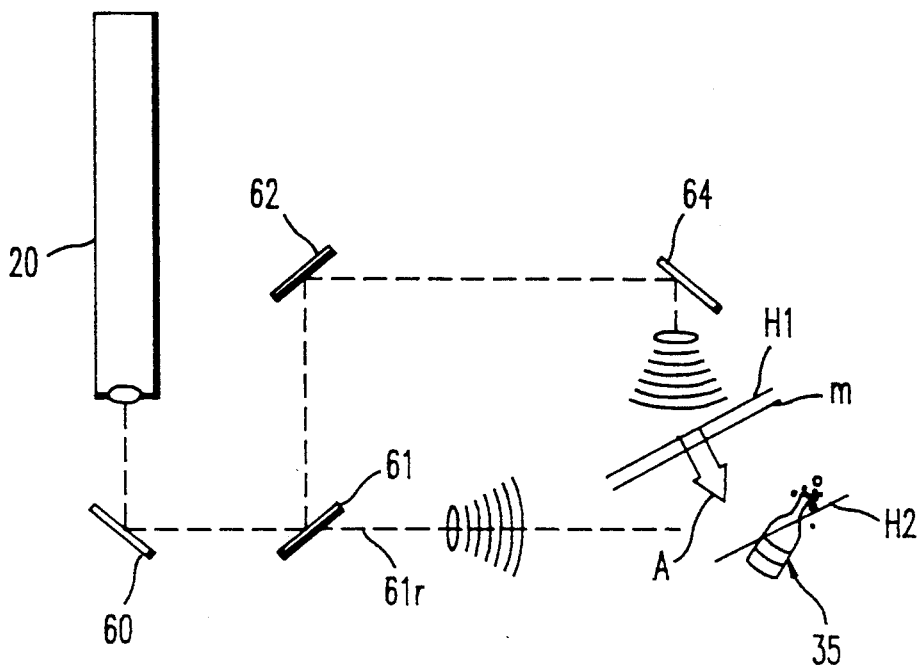
FIGS. 1 and 2 respectively illustrate forming and display of a rainbow hologram.
Figure 2:
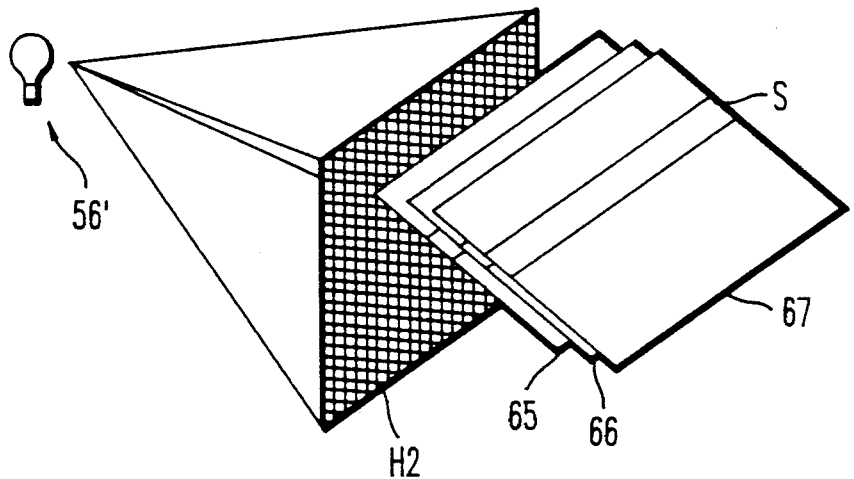

Referring to FIG. 3A, an object 0 (a liberty bell for illustrative purposes) is provided which is desired to be displayed in a holographic display. First, a holographic plate H1 is provided for recording the object image. In forming the object image, the object is illuminated, and the light reflected from the object impinges upon the holographic plate H1. The wavefronts of the light reflected by the object are represented schematically in FIG. 3A as shown by arrows 2. Simultaneously, a collimated reference beam, represented schematically at 4, impinges upon the holographic plate H1. The object beam 2 and reference beam 4 thus interfere with one another within the holographic plate and form an interference pattern or grating which accurately documents the wavefronts present during the recording process.

In forming a white light viewable hologram or rainbow hologram, the hologram H1 is utilized as a master hologram, with the master hologram H1 then illuminated by a conjugate illumination beam as illustrated schematically at 6 in FIG. 3B. The beam 6 is referred to as a conjugate beam since it is oriented at 180° with respect to reference beam 4 used in forming the master hologram H1. It should be noted that the orientation of H1 is the same in both FIGS. 3A and 3B. In other words, during formation of the master hologram H1 (FIG. 3A), the reference beam 4 impinges upon one side of the plate, however, for illumination of H1 in forming H2 (FIG. 3B), the conjugate illumination beam illuminates H1 from the opposite side. Thus, the illumination beam 6 is disposed at 180° with respect to H1 as compared with the reference beam 4.

In order to eliminate vertical parallax, the master hologram or H1 is illuminated only through an aperture or slit 8 of a mask 10. As a result, the master hologram H1 is illuminated, with the wavefronts of the illuminated image schematically shown by arrows 12, which yield the appearance of a reconstructed real image represented at R. As shown in FIG. 3B, the holographic plate H2 is located between the master hologram and the location at which the reconstructed real image is formed. As a result, the hologram H2, when illuminated properly, provides an image in which the object which appears to be behind the plate H2. However, it is to be understood that H2 could also be formed such that the object appears partially in front and partially behind; or such that the image appears to be floating in front of the plate H2 when properly illuminated. Thus, the spacing between H1 and H2 (i.e. when forming H2) is artistically related to the image desired.

Conventionally, in forming the rainbow hologram H2, a collimated reference beam (e.g. 61r in FIG. 1) simultaneously impinges upon the holographic plate H2 as H1 is illuminated to form a reconstructed real image grating upon the holographic plate H2. However, in accordance with one aspect of the present invention, a converging reference beam is provided which impinges upon the plate H2 as the reconstructed real image hologram is formed on the plate H2. In particular, the reference beam is first passed through a lens, for example a biconvex lens 14, such that the reference beam is in the form of a converging reference beam 16. As shown in FIG. 3B, the reference beam 16 is a converging beam which is incident upon the recording plate H2 with a high degree of inclination or in other words, the beam is steeply incident upon the recording plate H2. A collimated light source impinges upon the convex lens 14, with the lens 14 in turn providing the converging reference beam 16.

As should be readily recognized, the pattern of light emanating from the convex lens 14 becomes smaller at distances farther from the lens 14, until the light ultimately becomes a point at the focal point F. However, since the converging light 16 is a reference light source, the entire holographic plate H2 must be flooded with the reference light during formation of H2. Accordingly, the lens 14 must be sized and spaced from the plate H2, such that the entire plate is provided with reference light. Thus, the size of the lens 14 will typically be on the order of twice the size of the plate H2.

In accordance with one aspect of the present invention, by utilizing a steeply incident and strongly converging reference beam in forming H2, the hologram can be reconstructed or illuminated with a highly divergent and steeply incident white light source, such that a compact display arrangement is possible.

Figure 4:
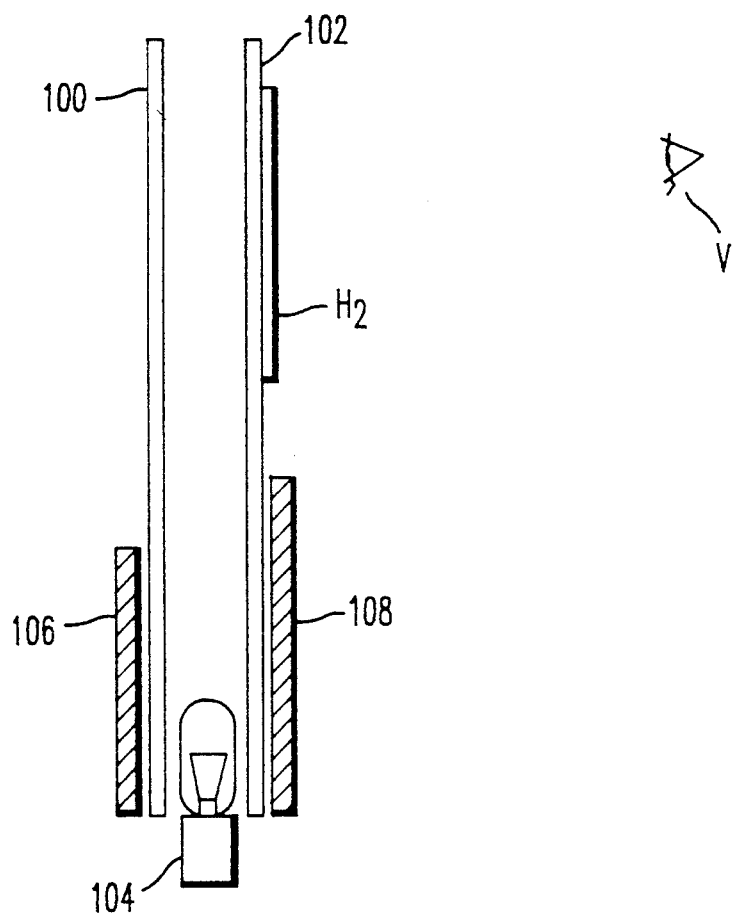
FIG. 4 illustrates an integrated rainbow hologram display arrangement in accordance with the present invention.

FIG. 4 shows a side view of a rainbow hologram display device in accordance with the present invention in which the light source is integral with the display unit. In particular, the display unit includes a pair of transparent sheets, for example glass sheets 100, 102, with the hologram H2 mounted on a front portion of the front glass sheet 102. The holographic plate H2 can be disposed within a frame, or other suitable display arrangement depending upon the intended use of the display. For example, the hologram can be merely framed as a work of artistic expression, or maybe associated with appropriate captions, for example in the context of an advertisement.

For illuminating the display, a white light source 104 is provided at a lower portion of the display. The power requirements for the light source are not excessive, and a 12 volt, 20 watt halogen light bulb has performed satisfactorily for this purpose. In addition, a pair of mirrors 106, 108 are disposed along lower portions of the respective glass sheets 100, 102. The mirrors 106, 108 primarily reflect the light such that a diverging illumination beam impinges upon the hologram H2 to thereby illuminate the display.

Preferably, the mirrors 106, 108 are aluminum mirrors such that they additionally perform a heat dissipation function. In particular, since the display is desired to be fairly small, in order to avoid excessive heating, the aluminum mirrors 106, 108 in contact with the glass sheets 100, 102 act to remove heat from the interior of the display, with the heat dissipated into the ambient. As a result, the interior of the display can be maintained at reasonable temperatures, for example 60° C. or less.

As should be readily apparent from FIG. 4, the rearward mirror 106 is slightly shorter than that of the frontward mirror 108. Such an arrangement prevents the possibility that a viewer will see the mirror 106 when viewing the image at a viewer vantage point V. It is to be understood that, if desired, the mirrors 106, 108 may extend over a greater portion of the glass sheets 100, 102, and mirror 106 could even extend over substantially the entire glass sheet 100. Additional mirror area can increase the brightness of the display, however the image quality can deteriorate and the viewer may see their own image when looking into the display.

The light source 104 thus provides a conjugate illumination beam in the form of diverging illumination light incident on a side of the plate H2 opposite to that upon which the converging reference light 16 impinged (FIG. 3B). In order to minimize aberrations in the image, the light source is preferably at a location, with respect to H2, which corresponds to the focal point F of the converging reference beam (FIG. 3B). More particularly, in positioning the light source 104, first an incident angle is determined by drawing a line from the center of H2 to the focal point F in FIG. 3B. Then, in determining the position of light source 104, a line can be drawn at this same incident angle, from H2 in FIG. 4 back toward the glass sheet 100. From this point, the path continues along a zig-zag path which can be calculated based upon reflection laws as the light bounces off the glass sheets and mirrors. It should be noted, however, that the positioning of the light source in many applications may not b critical, since the human eye is typically able to accommodate aberrations and properly focus the image. Therefore, many aberrations will not be recognized to the ordinary observer. Proper positioning of the light source is beneficial however, since the images will be more comfortable or less fatiguing to the eye.

Preferably, the filament of the source 104 is as small as possible such that the light source approximates a point source, thereby improving the "spatial coherence" of the display. Where a somewhat linear filament is utilized, the filament should extend perpendicular to the plane of H2 or, in other words, perpendicular to the glass sheets. The light from light source 104 thus bounces off mirrors 106, 108 and is refracted by glass sheets 100, 102 to provide diverging illumination light to the plate H2.

Figure 5:
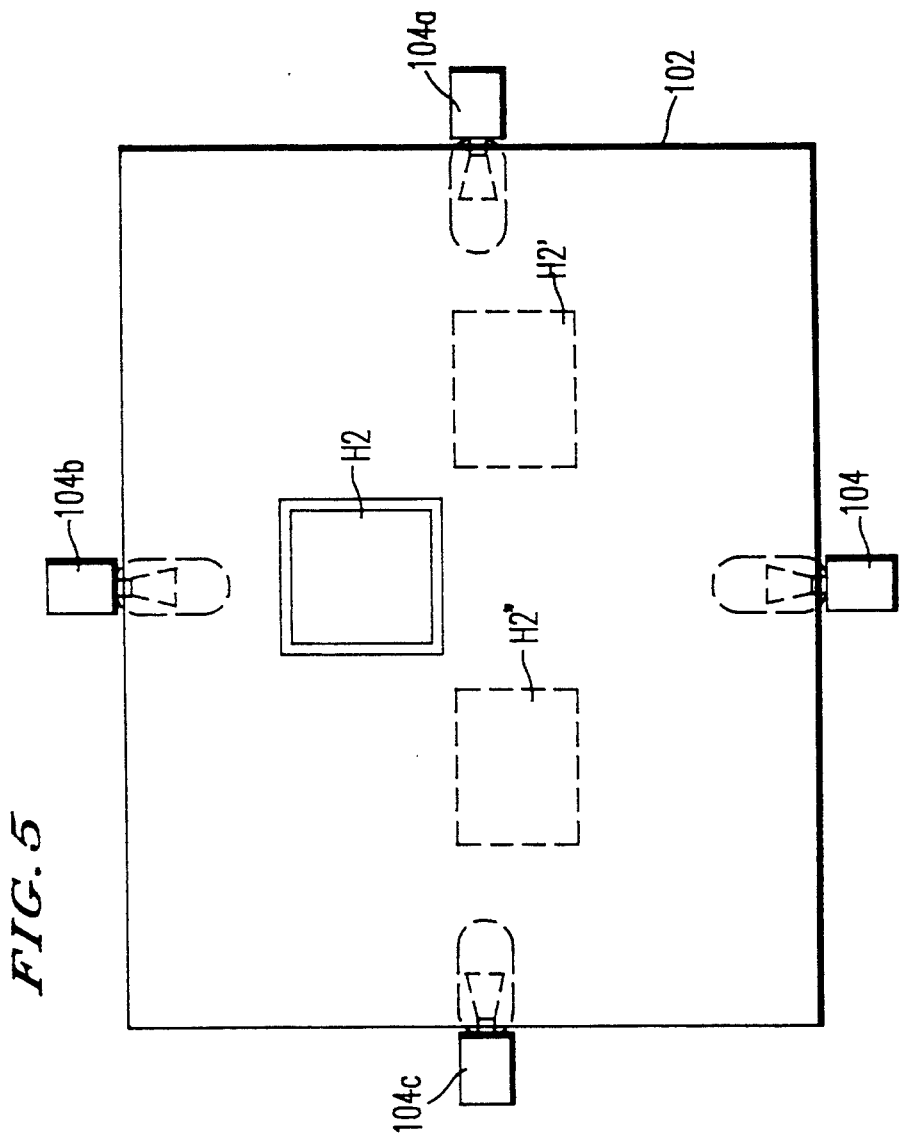
FIG. 5 illustrates additional optional features of a display device in accordance with the present invention.

Referring now to FIG. 5, additional optional aspects of the present invention will be described. FIG. 5 shows a view of the display from a side which a viewer would view displayed images. As shown in FIG. 5, the display can include a plurality of light sources, for example as shown at 104, 104a, 104b, 104c. The light sources can simultaneously illuminate plural plates, or may sequentially illuminate different holograms formed on a single plate. For example, in sequentially illuminating different images on a single plate H2, the lower light source 104 can be turned on to illuminate a first image of H2, with source 104 then turned off as source 104b is turned on to illuminate a second image of H2. In forming H2 in such an arrangement, the first image is formed as shown in FIG. 3B, with the second image thereafter similarly formed, however utilizing a converging reference beam coming from below the plate rather than above. Of course, the illumination sources 104, 104b should be properly positioned with respect to H2, and in a sequential illumination, H2 would likely be positioned more toward the center of the display. Third and fourth holograms could also be formed on H2 and illuminated by sources 104a, 104c.

Still referring to FIG. 5, the display of the present invention may also be utilized to simultaneously or sequentially illuminate additional plates shown in broken line at H2', H2". For example, the diverging illumination light from 104 can illuminate H2 to display an image, with 104a illuminating H2", and 104c illuminating H2'. This illumination can be simultaneous or sequential. Of course, the plates H2, H2', H2" are formed with converging reference beams such that the sources 104, 104c, 104a provide conjugate diverging illumination light. The plural plates H2, H2', H2" can display different images, or may display the same image which is visible from different vantage points thereby increasing the number of viewers which can see a displayed image at the same time.

Thus, the present invention provides a compact integrated rainbow hologram display arrangement which can provide full color or pseudo-color holographic displays, with the light source integral with the display. The display can utilize a relatively simple light source, yet will provide for reduced Rayleigh scattering as compared, for example, to edgelit hologram displays as developed by Benton. The Rayleigh scattering is improved, since the refractive properties of the spaced glass sheets provide light which is less steeply incident upon the holographic plate even though the light source (104) at a steeply incident angle with respect to the hologram being illuminated (H2).

Obviously, numerous modifications and variations of the present invention are possible in light of the above teachings. It is therefore to be understood that within the scope of the appended claims, the invention may be practiced otherwise than as specifically described herein.

We claim:

1. A holographic display comprising:
   first and second spaced transparent sheets;
   a holographic plate mounted upon one of said sheets;
   first and second mirrors respectively overlying portions of said first and second spaced transparent sheets such that reflective surfaces of the first and second mirrors are facing each other and wherein said first mirror is disposed on the same sheet upon which the holographic plate is mounted and is larger than said second mirror; and
   a light source disposed between said transparent sheets.

2. The display of claim 1, wherein said mirrors are disposed adjacent to said light source.

3. The display of claim 1, wherein said light source is a white light source.

4. The display of claim 3, wherein said light source includes a halogen lamp.

5. The display of claim 1, wherein said light source provides a diverging illumination light to the holographic plate.

6. The display of claim 5, wherein said holographic plate includes a rainbow hologram formed therein.

7. The display of claim 6, wherein said holographic plate includes a hologram formed utilizing a converging reference light.

8. The display of claim 1, further including a plurality of light sources at different locations between the transparent sheets for illuminating different images.

9. The display of claim 8, wherein said holographic plate includes a plurality of holograms for forming a plurality of images, and said plurality of light sources can successively illuminate the plurality of images.

10. The display of claim 8, wherein said display includes a plurality of holographic plates which are illuminates to form images by different respective light sources of said plurality of light sources.

11. A method for providing holographic display comprising;
    providing first and second spaced transparent sheets;
    mounting a holographic plate upon one of said sheets;
    providing first and second mirrors respectively overlying portions of said first and second spaced transparent sheets such that reflective surfaces of the first and second mirrors are facing each other, said first mirror being larger than said second mirror, said first mirror being disposed on the same sheet upon which said holographic plate is mounted; and providing a light source disposed between said transparent sheets for providing an illuminating light for the holographic plate.

12. The method of claim 11, wherein the step of providing a light source includes providing a light source which illuminates the holographic plate with diverging light.

13. The method of claim 11, wherein the step of providing a holographic plate includes forming a rainbow hologram utilizing a converging reference light, and wherein the light source illuminates the holographic plate with diverging light which impinges upon the holographic plate from a side opposite to that upon which the converging reference light is directed.

14. A method for providing a holographic display having a self-contained light source comprising;

forming a hologram on a holographic plate utilizing a converging reference light;

mounting said holographic plate upon a first transparent sheet;

providing a second transparent sheet spaced from said first transparent sheet;

disposing first and second mirrors over respective portions of each of said first and second transparent sheets such that reflective surfaces of said mirrors are facing each other, said first mirror disposed on said first transparent sheet being larger than said second mirror; and providing an illuminating light source between said first and second transparent sheets such that said light source provides a diverging illumination light.

15. The method of claim 14, further including disposing said first and second transparent sheets in parallel relation to each other.

16. The method of claim 14, wherein the step of utilizing a converging reference light includes providing a convex lens to form the converging reference light.

17. A holographic display comprising;

first and second spaced transparent sheets; a holographic plate mounted upon one of said sheets;

first and second mirrors respectively overlying portions of said first and second spaced transparent sheets such that reflective surfaces of the first and second mirrors are facing each other, said mirrors being aluminum mirrors such that the mirrors assist in dissipating heat from the display; and a light source disposed between said transparent sheets.

* * * * *